United States Patent [19]

Buijsen

[11] Patent Number: 4,617,484

[45] Date of Patent: Oct. 14, 1986

[54] ELECTRIC MOTOR WITH A TORSIONALLY FLEXIBLE ROTOR MOUNT

[75] Inventor: Johannes C. M. Buijsen, Dordrecht, Netherlands

[73] Assignee: U.S. Philips Corporation, New York, N.Y.

[21] Appl. No.: 694,714

[22] Filed: Jan. 25, 1985

[30] Foreign Application Priority Data

Feb. 2, 1984 [NL] Netherlands ................ 8400311

[51] Int. Cl.⁴ .................................. H02K 5/24
[52] U.S. Cl. ............................ 310/51; 310/67 R
[58] Field of Search ............ 310/43, 51, 67 R, 89, 310/156, 261, 266, 42

[56] References Cited

U.S. PATENT DOCUMENTS

| | | |
|---|---|---|
| 2,207,251 | 7/1940 | Guedon ............................ 310/51 |
| 2,874,008 | 2/1959 | Orte et al. ......................... 310/51 |
| 3,226,579 | 12/1965 | Bydgnes ............................ 310/51 |
| 3,483,407 | 12/1969 | Fohmüller et al. ................ 310/51 |
| 3,737,693 | 6/1973 | Mishima ............................ 310/51 |
| 4,035,676 | 7/1977 | Adair ................................. 310/42 |
| 4,472,650 | 9/1984 | Advolotkin et al. ............. 310/156 |

FOREIGN PATENT DOCUMENTS 400957 11/1933 United Kingdom ............. 310/51

Primary Examiner—Patrick R. Salce
Assistant Examiner—D. L. Rebsch
Attorney, Agent, or Firm—David R. Treacy

[57] ABSTRACT

The rotor assembly of an electric motor is connected to a hub on the shaft by torsionally flexible radial spokes. A plate extends radially from the hub, with a surface facing the rotor assembly, and a vibration-damping element contacts the plate between that surface and the rotor assembly.

11 Claims, 2 Drawing Figures

ELECTRIC MOTOR WITH A TORSIONALLY FLEXIBLE ROTOR MOUNT

BACKGROUND OF THE INVENTION

The invention relates to an electric motor comprising a stator, a motor shaft, and a rotor assembly which is mounted on the motor shaft by means of a hub, the rotor assembly and the hub being interconnected by radially extending flexible spokes.

Such an electric motor is disclosed in U.S. Pat. No. 4,035,676. The known electric motor, which may be constructed for example as a synchronous motor, has a hollow rotor assembly around which the stator is arranged. The rotor assembly is mounted on a plurality of radially resilient but flexible spokes of a plastics material, which spokes are integral with the hub. The spokes constitute a flexible connection between the rotor assembly and the motor shaft and serve to take up fluctuations in rotor assembly speed in order to ensure a smooth rotation of the motor shaft.

A disadvantage of the known electric motor is that the vibrations produced in the motor by torque fluctuations cannot be kept under control in a satisfactory manner, so that a specific frequencies annoying resonant effects may occur.

It is to be noted that the use of energy-absorbing elements in an electric motor is disclosed in U.S. Pat. No. 3,226,579. In this known motor the rotor assembly is journalled on the motor shaft by means of sleeve bearings and is secured to the shaft by a special elastic coupling. The absorbing elements which are constructed as cushions constitute an elastic part of the coupling. This known motor has the disadvantage that its resonant frequency is difficult to predict.

SUMMARY OF THE INVENTION

The object of the invention is to construct an electric motor of the type described above in such a way that the mechanical vibrations of the motor can be kept under control to a larger extent.

According to the invention, the electric motor includes a plate which is rigidly secured to the hub and a surface of which extends adjacent the rotor assembly, a vibration-damping element being clamped between the plate and the rotor assembly.

The rotor assembly, the torsionally flexible spokes, the vibration-damping element, the motor shaft and, as the case may be, a load coupled to this shaft, may together be regarded as a damped mass-spring system. If a fluctuation in rotor assembly speed causes the system to vibrate, the rotor assembly being displaced relative to the motor shaft, the vibration-damping element can limit the amplitude of the vibration through energy dissipation. This can substantially reduce the effects of possible resonances of the system and can largely prevent undesired variations in speed of the motor shaft from occurring. Irregularities in the rotor assembly speed may arise, among other reasons, because of retentive forces between the rotor assembly and the stator and upon energization of the motor coils.

An electric motor in accordance with the invention may be constructed for example as a small d.c. motor or a synchronous motor and can be very suitable for use in technical equipment which imposes very stringent requirements on the uniform rotation of the motor shaft. Therefore, such an electric motor may be used to advantage in audio and video equipment, for example for driving a head drum of a video recorder.

The vibration-damping element may be made of an energy-absorbing or dissipating material, for example a synthetic rubber such as butyl rubber.

Preferably, the plate carries a plurality of projections on the surface facing the rotor assembly. These projections act against the vibration-damping element. If this is the case, the plate is preferably disc-shaped and the projections are preferably equidistantly spaced along its circumference. It can be arranged that such projections press the vibration-damping element locally against the rotor assembly over a predetermined area and with a predetermined force in a well-defined manner. Very good results can be obtained if the vibration-damping element is in the form of a circular band.

An embodiment of the invention will be described in detail, by way of example, with reference to the accompanying diagrammatic drawings,

DESCRIPTION OF THE PREFERRED EMBODIMENT

Figure 1:
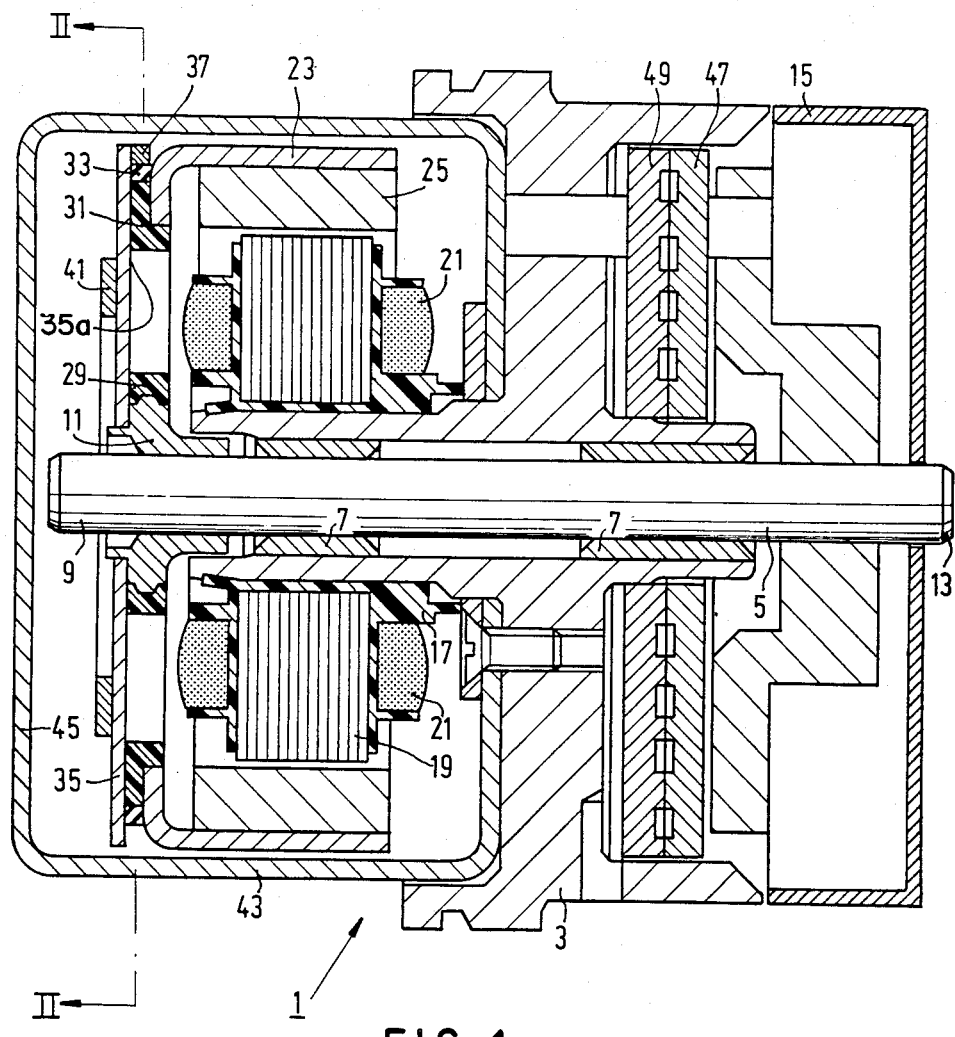
FIG. 1 is a longitudinal sectional view of a video tape drum drive embodying the invention.

In FIG. 1 an electric motor 1 is constructed as a d.c. motor for incorporation in a video recorder. The electric motor 1 comprises a stationary portion 3 in which a motor shaft 5 is journalled by means of two spiral-groove bearings 7. The electric motor can be mounted in the recorder by engaging surfaces on the portion 3. A metal hub 11 is locked on an end 9 of the motor shaft 5 so that it rotates with the shaft, and a rotary head drum 15 is mounted on the other end 13.

The amination-supporting part 3 carries a stator which comprises a portion 17 and a lamination assembly 19 around which coils 21 have been wound. A rotor assembly which comprises an outer ring 23 provided with a cylindrical permanent magnet 25 on its inner side surrounds the stator 17.

Figure 2:
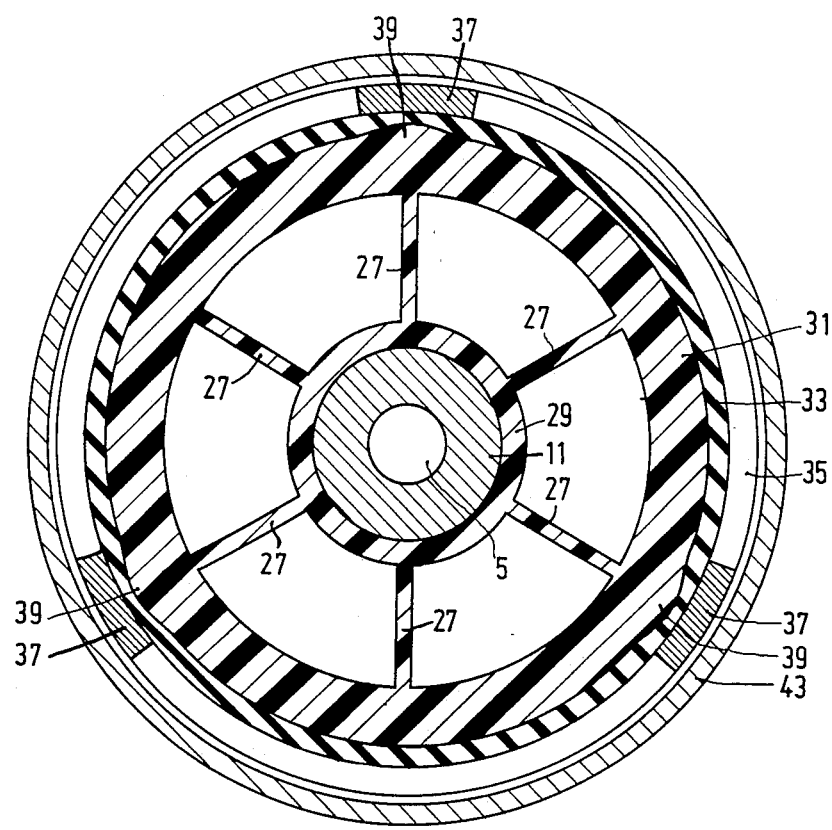
FIG. 2 is a cross-sectional view taken on the line II—II in FIG. 1.

The outer ring 23 of the rotor assembly is elastically connected to the hub 11 by six flexible spokes 27 of a plastic material which extend radially (see FIG. 2) between a ring 29 provided on the hub 11 and a ring 31 which forms part of the rotor assembly and carries the rotor assembly outer ring 23. In the present embodiment, the parts 27, 29 and 31 are manufactured as a single injection-molded product from a copolymer of acryl butadiene styrene and polycarbonate.

A vibration-damping element, which in the present embodiment is constructed as a circular band 33 of butyl rubber, extends in a plane parallel to that containing the flexible spokes 27. The band 33 is clamped between the outer ring 23 of the rotor assembly and a disc-shaped metal plate 35 which is rigidly secured to the hub 11 and has a surface 35a which extends adjacent the rotor assembly portion 23. The plate 35 has three projections 37 on the surface 35a, which cooperate with three raised portions 39 on the ring 31 carrying the rotor assembly portion 23, so that at least at the location of the projections 37, the vibration-damping band 33 is clamped between the outer ring 23 of the rotor assembly and the plate 35.

On its side which is remote from the rotor assembly outer ring 23, the plate 35 carries a magnetic ring 41 which forms part of a tacho-generator, not shown. A housing 43, a portion of which constitutes an end cover 45, is secured to the stationary portion 3 and encloses and thereby projects the rotor assembly.

The head drum 15 on the motor shaft 5 carries two video heads, not shown, and a transformer disc 47 which is disposed opposite a stationary transformer disc 49 attached to the stationary portion 3. The two transformer discs 47 and 49 serve to transmit information from the rotary head drum 15 to the stationary portion 3, and vice versa.

What is claimed is:

1. An electric motor comprising a stator, a motor shaft having a hub, a rotor assembly mounted about said shaft, and a plurality of radially extending torsionally flexible spokes interconnecting said hub and said rotor assembly,
    characterized by comprising a rigid plate extending radially from and rigidly secured to the hub, and having a surface which extends adjacent to and facing the rotor assembly, and
    a vibration-damping element clamped between the plate and the rotor assembly.

2. A motor as claimed in claim 1, characterized in that said plate includes a plurality of axially extending projections which bear on the vibration-damping element.

3. A motor as claimed in claim 2, characterized in that said vibration-damping element is formed as a circular band.

4. A motor as claimed in claim 1, characterized in that said vibration-damping element is formed as a circular band.

5. An electric motor comprising a stator, a motor shaft having a hub, a rotor assembly mounted about said shaft, and a plurality of radially extending torsionally flexible spokes interconnecting said hub and said rotor assembly,
    characterized by comprising a rigid plate extending radially from and rigidly secured to the hub, and having a surface which extends adjacent to and facing the rotor assembly, and
    a plastic rotor-attaching element, comprising a central portion mounted on the hub adjoining said plate, a plurality of torsionally resilient spokes extending radially from said central portion, and an outer circumferential portion adjoining said surface, connected to said central portion by said spokes, and
    a vibration-damping element held against said surface adjacent said rotor assembly for damping torsional vibration of the rotor assembly with respect to the plate.

6. A motor as claimed in claim 5, characterized in that said element is a body of deformable material clamped between the rotor assembly and said surface.

7. A motor as claimed in claim 6, characterized in that said body is an annular band.

8. A motor as claimed in claim 5, characterized in that said element is an annular band of deformable material disposed about and in contact with said outer circumferential portion.

9. A motor as claimed in claim 8, characterized in that said annular band is clamped between said surface and said rotor assembly.

10. A motor as claimed in claim 9, characterized by comprising a plurality of axially extending projections connected to one of said plate and said rotor assembly, said projections bearing against an outer circumferential surface of the band.

11. A motor as claimed in claim 5, characterized in that said vibration-damping element is an annular band, and said plate comprises a plurality of axially extending projections arranged to bear against an outer circumferential surface of said band.

* * * * *